US008780864B2

(12) United States Patent
Rydnell et al.

(10) Patent No.: US 8,780,864 B2
(45) Date of Patent: Jul. 15, 2014

(54) METHOD AND DEVICE FOR HANDLING HANDOVER OF A COMMUNICATIONS SERVICE

(75) Inventors: Gunnar Rydnell, Västra Frölunda (SE); Roland Gustafsson, Löverud (SE); Ann-Christine Sander, Västra Frölunda (SE); Stefan Karl Toth, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 193 days.

(21) Appl. No.: 13/532,174

(22) Filed: Jun. 25, 2012

(65) Prior Publication Data

US 2013/0010751 A1    Jan. 10, 2013

Related U.S. Application Data

(63) Continuation of application No. PCT/EP2012/061963, filed on Jun. 21, 2012.

(60) Provisional application No. 61/504,322, filed on Jul. 5, 2011.

(51) Int. Cl.
*H04W 36/14* (2009.01)

(52) U.S. Cl.
USPC .......................................................... 370/331

(58) Field of Classification Search
CPC ... H04W 80/04; H04W 36/18; H04W 6/0011; H04W 36/14; H04W 36/08; H04W 72/04; H04W 88/08; H04W 76/00
USPC .................................. 370/331, 329, 311, 310
See application file for complete search history.

(56) References Cited

U.S. PATENT DOCUMENTS

| 8,396,477 B2 * | 3/2013 | Kanazawa et al. ............ 455/436 |
| 2012/0172042 A1 * | 7/2012 | Drevon et al. ............... 455/436 |

FOREIGN PATENT DOCUMENTS

| EP | 2131603 A1 | 12/2009 |
| EP | 2244504 A1 | 10/2010 |

OTHER PUBLICATIONS

"3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 10)", 3GPP Standard; 3GPP TR23.885, 3rd Generation Partnership Project (3GPP), Mobile Competence Centre, 650 Route Des Lucioles, F-06921 Sophia-Antipolis Cedex, France, vol. SA WG2, No. V1.3.0, Jun. 16, 2011, pp. 1-80, XP050553147.

(Continued)

*Primary Examiner* — Andrew Lai
*Assistant Examiner* — Zhiren Qin
(74) *Attorney, Agent, or Firm* — Rothwell, Figg, Ernst & Manbeck, P.C.

(57) ABSTRACT

The embodiments herein relate to a method in a network node for enabling handover of a communications service from a circuit switched, referred to as CS, network to a packet switched, referred to as PS, network, wherein a user equipment is located in the CS network and having the communications service in the CS network.

18 Claims, 7 Drawing Sheets

(56) References Cited

OTHER PUBLICATIONS

ZTE, "Service request procedure", 3GPP Draft, WS-072719-Service Request, 3rd Generation Partnership Project (3GPP), Mobile Competence Centre, 650, Route Des Lucioles, F-06921 Sophia-Antipolis Cedex, France, vol. SA WG2, No. Orlando, FL., Jun. 19, 2007, 3 pages, XP050260586.

Ericsson at al., "Update of Access Transfer Control Functionality", 3GPP Draft; S2-113024_RSRVCC-ALT-1-Update, 3rd Generation Partnership Project (3GPP), Mobile Competence Centre, 650, Route Des Lucioles, F-06921 Sophia-Antipolis Cedex, France, vol. SA WG2, No. Naantali, Finland, Jul. 5, 2011, 6 pages, XP050548362.

International Search Report and Written Opinion issued on Sep. 28, 2012 in PCT application No. PCT/EP2012/061963, 13 pages.

* cited by examiner

METHOD AND DEVICE FOR HANDLING HANDOVER OF A COMMUNICATIONS SERVICE

This application claims the benefit of U.S. provisional patent application No. 61/504,322, filed on Jul. 5, 2011; this application is also a continuation of international patent application no. PCT/EP2012/061963, filed on Jun. 21, 2012, which claims priority to said US provisional patent application. The above identified applications are incorporated by reference herein in their entirety.

TECHNICAL FIELD

Embodiments herein relate generally to a network node a method in the network node. More particularly the embodiments herein relate to enabling handover of a communication service between a Circuit Switched (CS) network and a packet switched (PS) network.

BACKGROUND

In a typical cellular network, also referred to as a wireless communication system, User Equipments (UEs), communicate via a Radio Access Network (RAN) to one or more Core Networks (CNs).

A user equipment is a mobile terminal by which a subscriber may access services offered by an operator's core network and services outside operator's network to which the operator's RAN and CN provide access. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. evolved Node B (eNB), "eNodeB", "NodeB", "B node", or BTS (Base Transceiver Station), depending on the technology and terminology used. The base stations communicate over the air interface operating on radio frequencies with the user equipments within range of the base stations.

In a typical cellular system, also referred to as a wireless communications network, wireless terminals, also known as mobile stations and/or User Equipment units communicate via Radio Access Networks (RAN) to a core network The wireless terminals may be mobile stations or user equipments such as mobile telephones also known as cellular telephones, and laptops with wireless capability, e.g., mobile termination, and thus may be, for example, portable, pocket, hand-held, computer-included, or car-mounted mobile devices which communicate voice and/or data with radio access network.

The radio access network covers a geographical area which is divided into cell areas, with each cell area being served by a base station, e.g. a Radio Base Station (RBS), which in some radio access networks is also called eNodeB (eNB), NodeB, B node or base station. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations.

The cellular network may apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology.

In for example, LTE, users expect a new network to support all the services from a legacy network. To meet these needs, Inter-technology mobility is an important feature. In LTE, voice service over LTE is Internet Protocol Multimedia Subsystem (IMS)-based Voice Over Internet Protocol (VoIP). LTE is a packet data network and VoIP is used for supporting voice on packet networks.

Inter-technology mobility is also important for introduction of new services. Inter-technology mobility, enables that a new service may be rolled out network-wide even though the wireless broadband access technology that best and most efficiently supports it has only been deployed in the highest traffic areas. Inter-technology mobility provides a bridge between the old and new access networks enabling seamless service continuity for the user over a wide area.

Inter-technology mobility may simplify rollout of a new LTE where voice services is moved to VoIP over IMS in conjunction with the deployment of an LTE access network by using inter-technology mobility together with a functionality called Single Radio Voice Call Continuity (SRVCC). SRVCC is an LTE functionality that allows a VoIP/IMS call in the LTE packet domain to be moved to a legacy circuit domain, e.g. GSM/UMTS or CDMA.

When a user equipment with an ongoing IMS voice call in LTE looses its LTE coverage, provided the 2G/3G, i.e. Circuit Switched (CS) network, does not support VoIP, the user does SRVCC to 2G/3G and continues the voice call in the CS network through a Mobile Switching Centre Server (MSC). The MSC is a 3G core network element which controls the network switching subsystem elements. When the user equipment gets back into LTE coverage, the operator may want for different reasons to move the user equipment back to LTE. That procedure is called CS to PS or return SRVCC (rSRVCC). Another use case for rSRVCC may also be that the user equipment was camping in 2G/3G and started a CS voice call in 2G/3G through the MSC. After some time the user equipment gets into LTE coverage, upon which the rSRVCC is triggered.

A handover of an ongoing voice call from LTE to a 3G or 2G network, or a handover of an ongoing voice call from 2G/3g to LTE is done by using a mechanism relating to handling a dedicated bearer. In general, a bearer is a logical channel that carries some information. A bearer may also be referred to as a radio resource. One EPS bearer is established when the user equipment 101 connects to the Packet Data Network (PDN) and remains throughout the lifetime of the connection. It is called as default bearer. Default bearer provides always on IP connectivity to the network. Any additional EPS bearer is called a dedicated bearer. Dedicated bearers contexts are established when a service in the network requests a prioritising of IP packets belonging to a specific media stream between two IP addresses and TCP/UDP ports. A dedicated bearer is a bearer that carries traffic for IP flows that have been identified as requiring a specific packet forwarding treatment. A dedicated bearer is request by a user equipment to transmit data with a particular QoS.

A criterion for enabling rSRVCC may be that it should have minimal impacts on the networks. An alternative solution for enabling rSRVCC is that the user equipment reselects to LTE and then starts handing over the session from CS to PS, including both IMS transfer of the session from CS to PS as well as radio bearer setup of dedicated voice bearer in the EPC. The alternative implies large disturbance of the voice call during the handover of the user equipment, which leads to high bit rate error and reduced quality of the service for the user equipment.

Another solution, see FIG. 3, comprises a preparation phase in the source system prior to handover to the target system is started and implies a CS to PS Request from the MSC to the SGSN. The alternative furthermore implies setting up of dedicated voice bearer in the SGSN prior to the rSRVCC handover. This impacts several nodes in the network, such as the SGSN, SGW and PGW as well as PCC, which increase both the complexity of the communications network and the signaling load in the network.

A disadvantage is that it degrades the user service quality experience, e.g. QoS, call drop, interruption time, is minimized.

Another problem is that the MSC needs a procedure to find the source SGSN/MME, thus implying DNS procedures in the MSC.

SUMMARY

An objective of embodiments herein is therefore to obviate at least one of the above disadvantages and to provide improved handling of handover of a communications service.

According to a first aspect, the objective is achieved by a method in a network node for enabling handover of a communications service from a circuit switched, referred to as CS, network to a packet switched, referred to as PS, network. The user equipment is located in the CS network and has the communications service in the CS network. The network node receives a trigger indicating setup of a dedicated bearer associated with the communications network in the PS network. Based on the trigger, the network node determines that the setup of the dedicated bearer in the PS network should be delayed. The network node delays the dedicated bearer setup. The network node receives information that the handover from the CS network to the PS network is completed. The network node setting up the dedicated bearer associated with the communications service when the information that the handover from the CS network to the PS network is completed is received.

According to a second aspect, the objective is achieved by a network node for enabling handover of a communications service from a circuit switched, referred to as CS, network to a packet switched, referred to as PS, network. A user equipment is located in the CS network and has the communications service in the CS network. The network node comprises a receiving unit configured to receive a trigger indicating setup of a dedicated bearer associated with the communications network in the PS network. The network node comprises a determining unit configured to, based on the trigger, determine that the setup of the dedicated bearer in the PS network should be delayed. The network node comprises a delaying unit configured to delay the dedicated bearer setup. The receiving unit is further configured to receive, information that the handover from the CS network to the PS network is completed. The network node further comprises a setup unit configured to set up the dedicated bearer associated with the communications service when the information that the handover from the CS network to the PS network is completed is received.

Embodiments herein afford many advantages, of which a non-exhaustive list of examples follows:

There are requirements in $3^{rd}$ Generation Partnership Project (3GPP) to specify a return SRVCC function, rSRVCC. The embodiments herein is a method that is simpler than any other methods discussed so far in 3GPP since it relies in higher degree on existing methods—IRAT and TAU, release with redirect from $3^{rd}$ Generation (3G), and the fact that in EPC/LTE, if there is no dedicated bearer for voice there is an allow-all default bearer on which voice can be sent, until the dedicated bearer is set up.

One advantage of the embodiments herein is that, still fulfilling the 3GPP requirements for rSRVCC, it has less impact on the existing EPC network, only impacting one network ode, while still not having any more impact on the other system nodes such as MSC, IMS, RAN or UE. The SGSN is not impacted at all.

An advantage of the embodiments herein is that it is simple, in the sense that impacts on EPC is only in the one node, e.g. the PCRF, the P-CSCF or the PGW.

A further advantage is that the embodiments herein imply improved voice quality for rSRVCC without new requirements on the SGSN or DNS look-up in the MSC Server.

Another advantage of the embodiments herein is that improves the user service quality experience, e.g. QoS, call drop, interruption time, is minimized.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to reverse or CS to PS Single Radio Voice Call Continuity (SRVCC).

Figure 1:
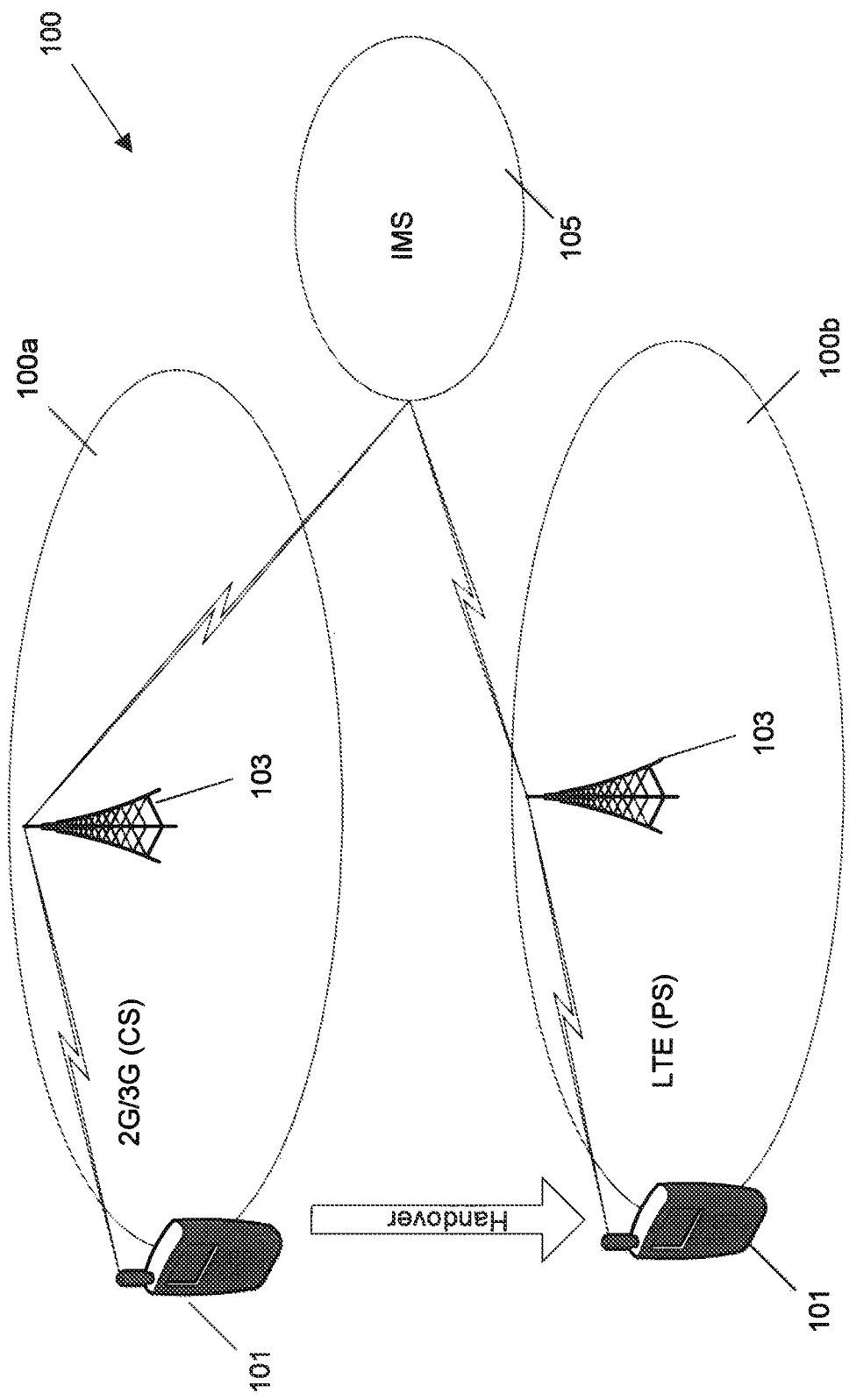
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology.

The communications network 100 comprises a base station 103 serving a cell. The base station 103 may be a base station such as a NodeB, an eNodeB or any other network unit capable to communicate over a radio carrier with a user equipment 101. The user equipment 101 is in this case capable of communicating with the first network node 110 over a radio carrier.

The user equipment 101 may be any suitable communication device or computational device with communication capabilities capable to communicate with a base station over a radio channel, for instance but not limited to mobile phone, smart phone, personal digital assistant (PDA), laptop, MP3 player or portable DVD player (or similar media content devices), digital camera, or even stationary devices such as a PC. A PC may also be connected via a mobile station as the end station of the broadcasted/multicasted media. The user equipment 101 may also be an embedded communication device in e.g. electronic photo frames, cardiac surveillance equipment, intrusion or other surveillance equipment, weather data monitoring systems, vehicle, car or transport communication equipment, etc. The user equipment 101 is referred to as UE in some of the figures.

The user equipment 101 may be in an area with 2G/3G coverage, i.e. the user equipment 101 may be in a CS network 100a. The user equipment 101 has an ongoing IMS 105 communications service in the CS network 100a. IMS 105 is a framework for delivering IP multimedia services. At some point, the user equipment 101 moves from the CS network 100a to an area with LTE coverage, i.e. to a PS network 100b. This may be called a CS to PS handover. For some reason, an operator also wants the communications service to be moved from the CS network 100a to the PS network 100b. A CS network 100a is a technology by which e.g. two network nodes establish a dedicated communications channel, i.e. circuit, before the nodes may communicate. The circuit functions as if the nodes were physically connected as with an electrical circuit. In a PS network 100b data is moved in separate, small blocks, i.e. packets, based on the destination address in each packet. When received, packets are reassembled in the proper sequence to make up the message. The bit delay in a CS-network 100a is constant during a connection, as opposed to a PS network 100b, where packet queues may cause varying packet transfer delay.

Figure 2:
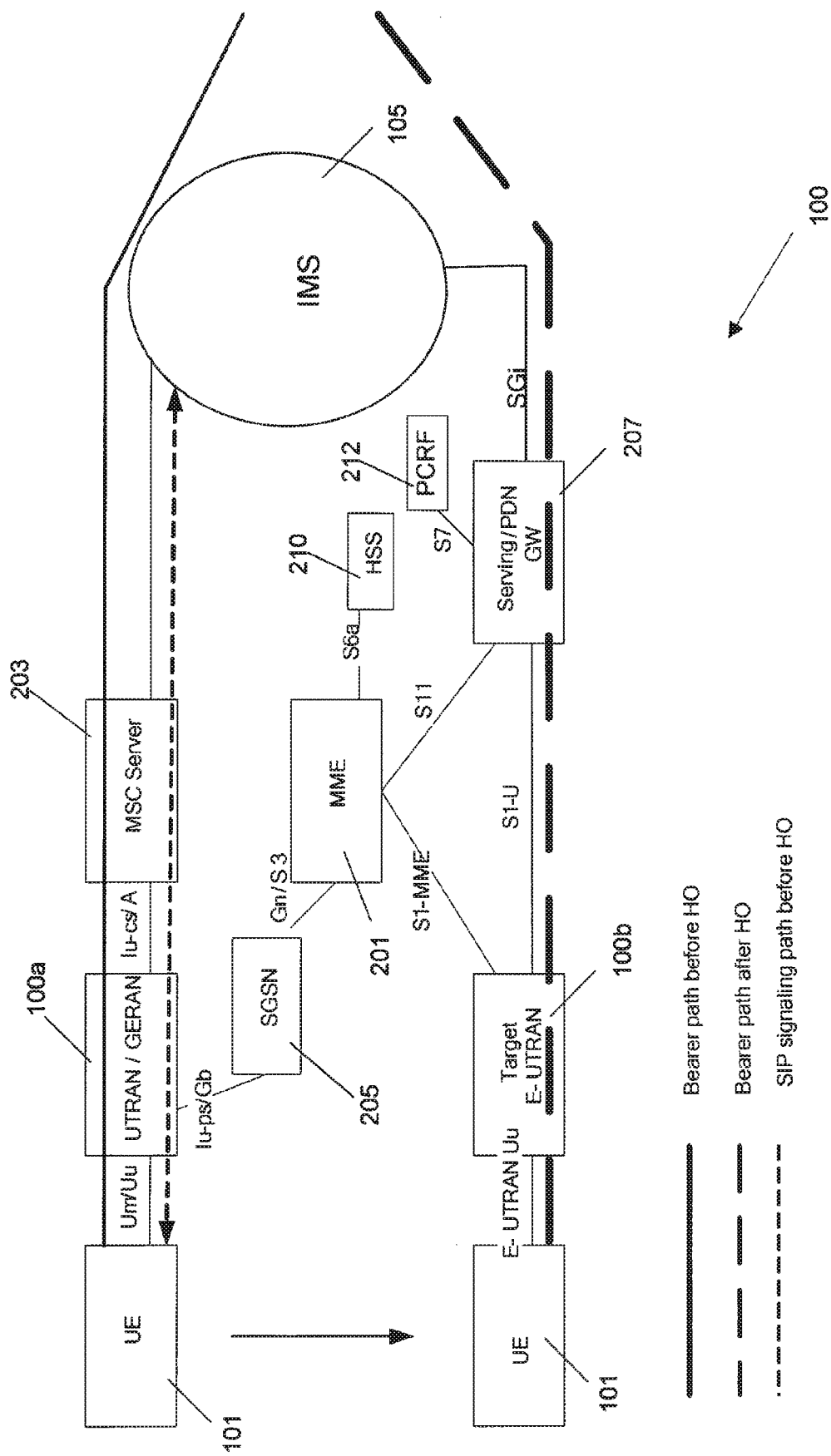
FIG. 2 is a schematic block diagram illustrating embodiments of a communications network.
Figure 3:
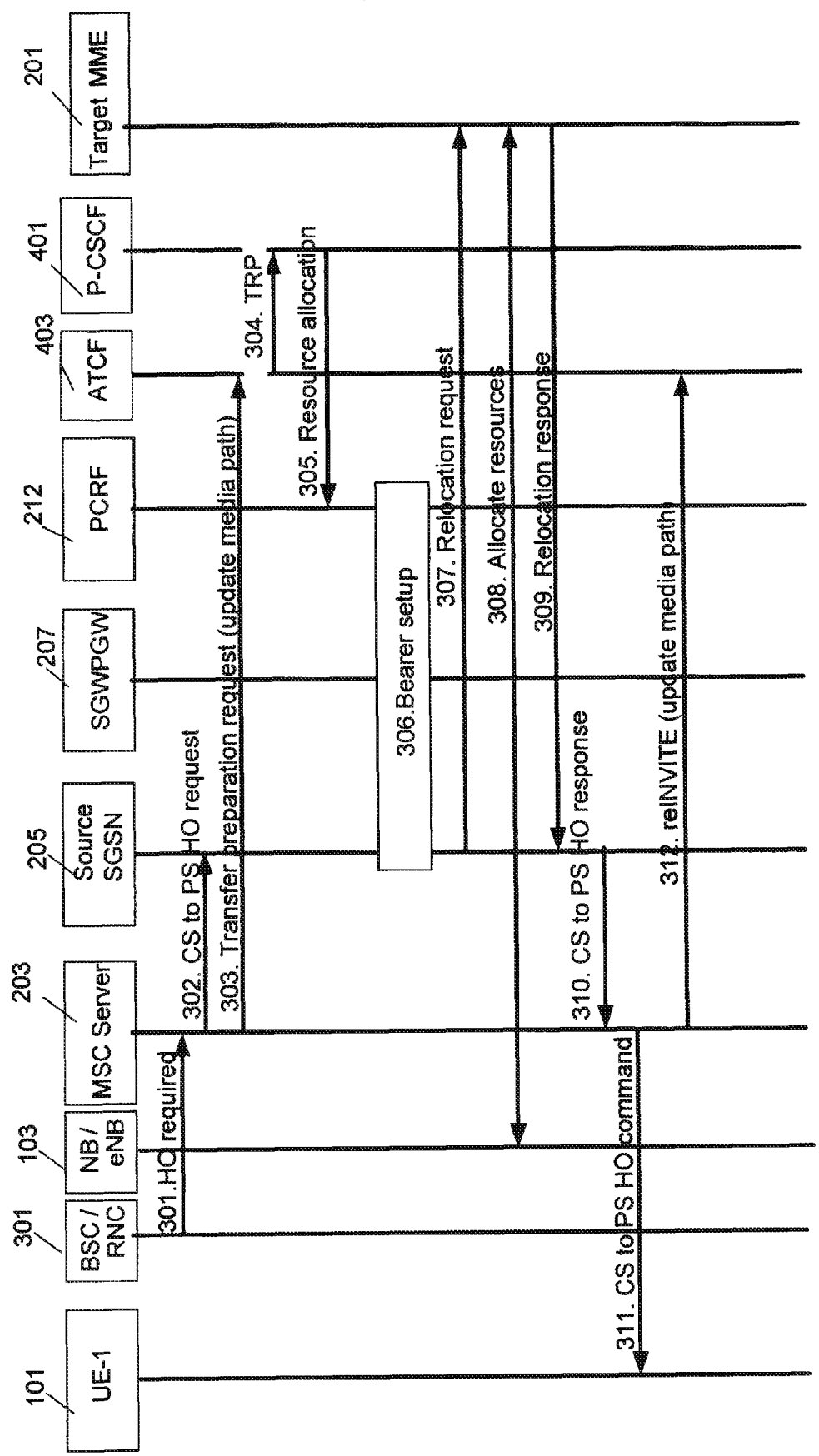
FIG. 3 is a combined flow chart and signaling diagram illustrating embodiment of a method.

FIG. 2 illustrates the communications network 100 in more detail. The user equipment 101 is handover from the CS network 100a, also referred to as UTRAN/GERAN, to the PS network 100b, also referred to as target E-UTRAN. The CS network 100a is connected, via an Iu-cs/A interface, to a MSC Server 203, and further to the IMS 105. As mentioned above, the MSC Server 203 controls the network switching subsystem elements. The CS network 100a is connected to, via an Iu-ps/GB interface, a Serving General Packet Radio Services Support Node (SGSN) 205 which is a node responsible for the delivery of data packets from and to the user equipment 101 within its geographical service area. The SGSN 205 is connected, via a Gn/S3 interface, to a MME 201, which is the key control-node for the LTE access-network 100b. The MME 201 is connected, via an S6a interface, to a Home Subscriber Server (HSS) 210. The HSS 210 is a master user database that supports the IMS network entities that actually handle calls, and it comprises subscription-related information, performs authentication and authorization of the user equipment, and may provide information about the subscriber's location and IP information. The PS network 100b is also connected, via a S1-MME interface, to the MME 201. The PS network 100b is connected, via a S1-U interface, to a Serving Packet Data Network (PDN) GateWay (GW) PGW 207. The PGW 207 is connected, via a S11 interface, to the MME 201. The PGW 207 is further connected, via a S7 interface, to a Policy and Charging Rules Function (PCRF) 212. The PCRF 212 is responsible for determining policy rules in a multimedia network. The PGW 207 is connected, via a SGi interface, to the IMS105. The continuous line in FIG. 2 illustrates a bearer path before the handover from the CS network 100a to the PS network 100b. The broken line illustrates a bearer path after the handover, and the dotted line illustrates a Session Initiation Protocol (SIP) signaling path before handover. SIP is a signaling protocol used for controlling multimedia communication sessions such as voice and video calls over IP.

The embodiments herein relates to performing rSRVCC using a minimum of preparation before doing handover, including early IMS session transfer, a deferred allocation of the dedicated bearer, and temporary media flow on an existing bearer in LTE. The deferred allocation means that the dedicated bearer is allocated after the user equipment 101 moves to LTE to provide a voice quality bearer, a delay of a fraction of a second.

The embodiments herein is a trade-off between complexity and voice quality, it will not imply new requirements on the SGSN 205 or DNS look-up in the MSC Server 203, still implying improved voice quality for rSRVCC.

It is a prerequisite that the user equipment is attached to the PS network 100a and has at least one PS bearer allocated in the PC/EPC. A user equipment 101 supporting S1 mode shall keep the default PDP context activated during the lifetime of the PDN connection. A user equipment 101 not supporting S1 mode should apply the same behavior.

The following use cases are supported in the embodiments herein. Note that there are slightly different scenarios for non-DTM Global System for Mobile Communications (GSM) Enhanced Data Rates for GSM Evolution (EDGE) Radio Access Network (GERAN), i.e. cases 1 and 3, depending on if the call was started in LTE or 2G/3G. Otherwise, i.e. cases 2 and 4 below, the use cases will be the same whether voice call is initiated in LTE or in 2G/3G. DTM is a protocol based on the GSM standard that allows simultaneous transfer of CS voice and PS data over the same radio channel.

(1) CS voice call initiated in GERAN without DTM: (a) Mobility to LTE is done by a TAU.

(2) CS voice call initiated in GERAN/UTRAN with DTM: (a) Mobility to LTE is done by a TAU, idle or connected state, or IRAT/PS Handover, connected state.

(3) Voice call initiated in LTE and SRVCC to GERAN without DTM support: (a) Mobility from GERAN to LTE can be performed with TAU, idle or connected state.

(4) Voice call initiated in LTE and SRVCC to GERAN/UTRAN with DTM: (a) Mobility from GERAN/UTRAN to LTE can be performed with TAU, idle or connected state, or IRAT/PS Handover, connected state.

Figure 4:
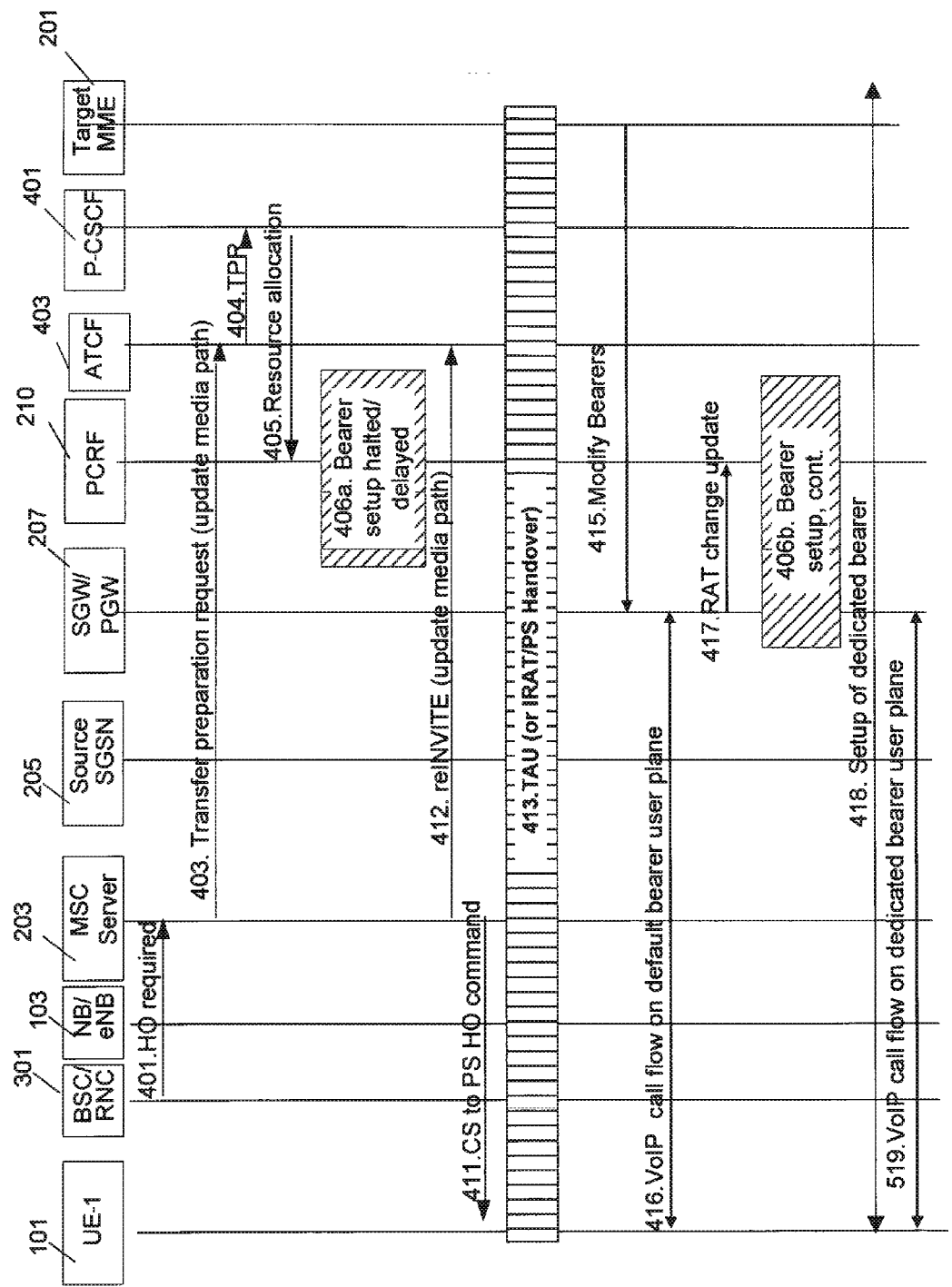
FIG. 4 is a combined flow chart and signalling diagram illustrating embodiments of a method.

The method for handling handover of the communications service according to some embodiments will now be described with reference to the combined signaling diagram and flowchart depicted in FIG. 4. In FIG. 4, the network node performing the halting of the bearer is the PCRF 210.

Step 401

The BSC/RNC 301 sends a handover required to the MSC Server 203, this message comprises the target Tracking Area Code. The handover required message comprises an indication this HO is for SRVCC. If the MSC Server 203 is the target MSC, it forwards the handover required to the anchor MSC Server.

Step 403

In some embodiments, the MSC Server 203 sends an Access Transfer Notification to the access transfer control function (ATCF) 501, e.g. a SIP re-INVITE or INVITE message, which indicates to the ATCF 501 that it should prepare for the transfer of media to PS100b.

The method uses signalling towards the IMS system from the MSC 203 to start session transfer from CS100a to PS100b. However, the signalling towards IMS may occur in other suitable ways.

Step 404

In some embodiments, the ATCF 501 retrieves the ports/codecs received from the user equipment 101 in its IMS registration. The MSC 203 is able to correlate the IMS registration made by the user equipment 101 and the one made by the MSC 203 on behalf of the user equipment 101, for instance based on the C-MSISDN or on the IMEI derived instance-id used by both those registrations. The ATCF 501 allocates media ports on the ATGW, forwards the Transfer Preparation Request to the P-CSCF 305 after comprising, in that message, the IP address/ports the user equipment 101 intends to use after the rSRVCC, as well as the IP address/ports the ATGW is sending voice media to, i.e. the SDP for both the user equipment 101 and the ATGW may be comprised in the message.

Step 405

The IMS, i.e. the P-CSCF 401, initiates bearer handling in EPC by sending the Resource Allocation request over the Rx interface, towards the PCRF 210 to trigger the setup of a Guaranteed Bit Rate (GBR) dedicated PS bearer with Quality of Service (QoS) suitable for voice.

In some embodiments, the Resource Allocation request comprises a parameter indicating that rSRVCC is done. The parameter enables the PCRF 210 to distinguish this case, i.e. rSRVCC, when the setup of the dedicated bearer shall be delayed, from an ordinary bearer resource request over Rx when the dedicated bearer is set up immediately.

This is a trigger to the next step, step 406a, for halting the bearer setup.

Step 406a

The PCRF 212 waits or halts to initiate the bearer setup towards P-GW 207 since this bearer establishment is due to rSRVCC.

Normally when PCRF 210 receives the resource Allocation message from step 405, it will start a resource allocation towards the PGW 207, which will trigger the PGW 207 to send Create Bearer Request towards the SGW 207 and MME 201. However, due to a race condition, i.e. the user equipment 101 may not yet have made the handover to LTE at this point in time, the bearer allocation for the voice bearer needs to be delayed and done only when the user equipment 101 has completed the handover to LTE.

The PCRF 210 needs to distinguish this case (rSRVCC), when the setup of the dedicated bearer shall be delayed, from an ordinary bearer resource request over Rx when the dedicated bearer is set up immediately. The PCRF 210 will understand that rSRVCC is done by a parameter included in the message from the P-CSCF in step 405. In some embodiments, it may be possible to know from configuration, even without an explicit indication over Rx, if delayed allocation shall be done. E.g. in the case of IMS voice only deployed over LTE but not in 2G/3G, the PCRF 210 may use the Radio Access Technology (RAT) information which indicates in which RAT the user equipment 101 is attached.

Step 412

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 sends an Access Transfer Preparation Request to the ATCF 501 and the media path between ATCF/ATGW and the MSC Server/MGW is to be established.

Step 411

The MSC 203 sends a "handover command" to the BSC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

The BSC 301 forwards the "handover command" to the user equipment 101, indicating CS to PS handover.

Step 413

A Tracking Area Update (TAU) or an Inter-Radio Access Technology (IRAT) PS handover is performed. TAU is a procedure initiated by the user equipment 101 to update the registration status with the network. There are many reasons for a TAU, e.g. the user equipment 101 moves into a new Tracking Area (TA), inter-system change, when a user equipment 101 comes back to LTE after CS fallback etc.

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 may send an Access Transfer Preparation Request to the ATCF 501 and the media path between ATCF/ATGW and the MSC Server/MGW is to be established.

The user equipment 101 may send a Handover confirmation to the eNB 103. In other words, handover to LTE is performed.

The eNB 103 may send a Handover Notify to the MME 201. In other words, handover to LTE is performed.

Step 415

The MME 201 sends a Modify Bearer Request to the SGW 207 to update PS bearer contexts first. The SGW 207 forwards the Modify Bearer Request to the PGW 207.

The MME 201 tells the PGW 207 and SGW 207 that the user equipment 101 is now reachable via the eNB 103. The new dedicated bearer for voice is added in step 406b as described below.

Step 416

The VoIP call or any communications service may be sent to the user equipment 101 in LTE via the default bearer.

Step 417

The PDN GW 207 informs the PCRF 212 about the change of, for example, the RAT type.

Step 406b

The PCRF 212 continues the halted voice bearer allocation. The PCRF 212 builds the corresponding PCC rule and sends it to the PGW 207.

The PCRF 210 will learn that the handover to LTE is completed through the, existing, RAT change signalling from the PGW 207, at which point the PCRF 210 may trigger the PGW 207 to start dedicated bearer allocation.

Step 418

The MME 201 sets up the dedicated bearer for the user equipment 101.

Even though the arrow symbolizing step 418 goes between the MME 201 and the user equipment 101, it may include multiple steps between the PCRF 210, PGW 207, SGW 207, MME 201 and the UE 101.

Step 419

Up until the point that the dedicated GBR bearer is allocated, i.e. after step 406b, the voice call user data may be sent in the default bearer in LTE. The default bearer in the IMS APN may be a QCI=5 bearer optimized for signalling and not for voice media. However for a short time after the handover to LTE, this bearer may be used for voice media also. TFT filters shall then be set in such a way that in addition to signalling packets, also voice user flows are allowed. In case of an "allow all" default bearer, and using a Fire-wall on the IMS APN, the MGW traffic must also be allowed.

After step 406b the dedicated bearer has been allocated in LTE and the VoIP call will be moved to the dedicated bearer. Thus impact to user service quality experience, e.g. QoS, call drop, interruption time, is minimized.

Figure 5:
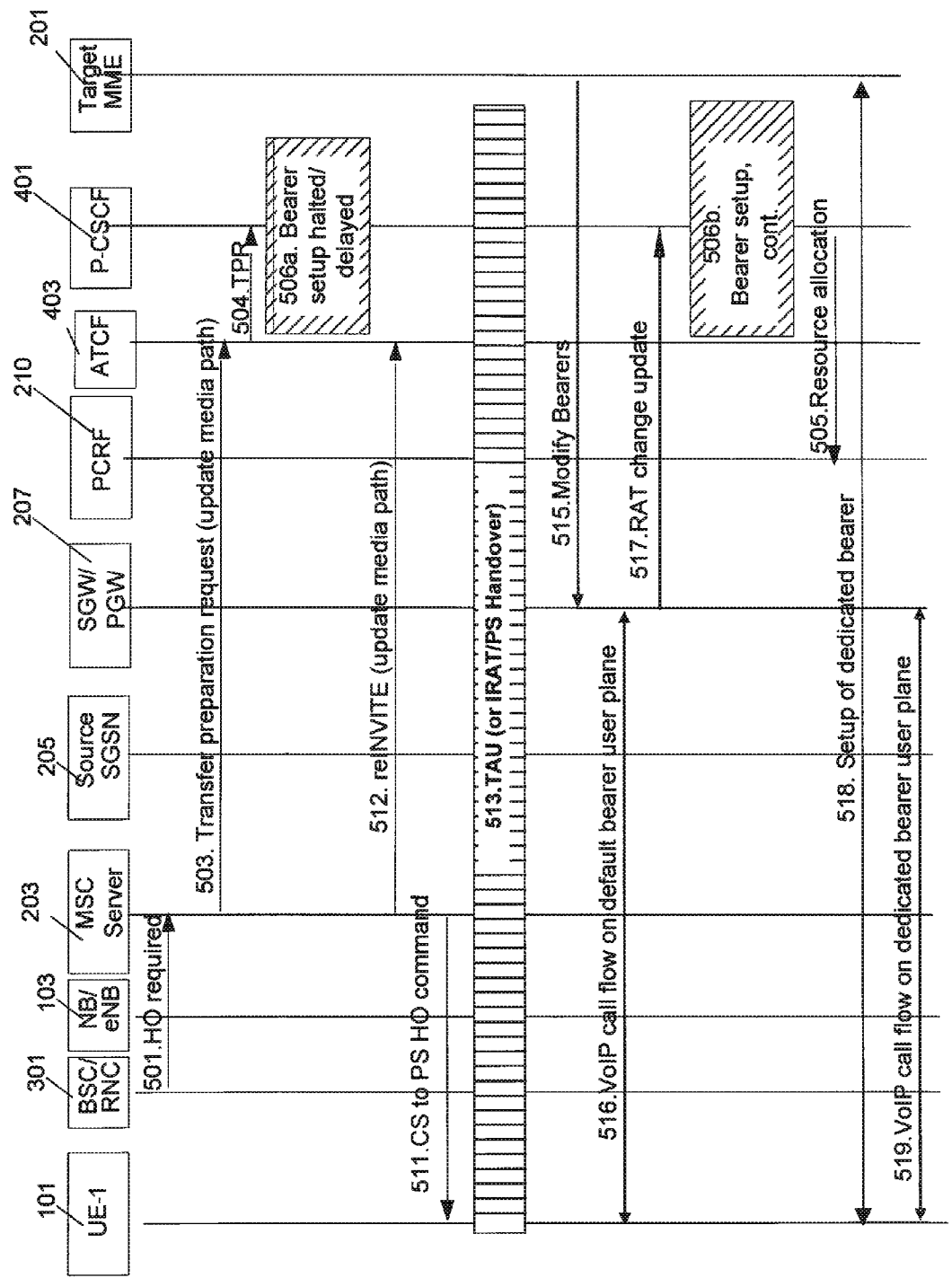
FIG. 5 is a combined flow chart and signaling diagram illustrating embodiments of a method.

The method for handling handover of the communications service according to some embodiments will now be described with reference to the combined signaling diagram and flowchart depicted in FIG. 5. In FIG. 5, the network node performing the halting of the bearer is the P-CSCF 401.

Step 501

This step corresponds to step 401 in FIG. 4.

The BSC/RNC 301 sends a handover required to the MSC Server 203, this message comprises the target Tracking Area Code. The handover required message comprises an indication this HO is for SRVCC. If the MSC Server 203 is the target MSC, it forwards the handover required to the anchor MSC Server.

Step 503

This step corresponds to step 403 in FIG. 4.

In some embodiments, the MSC Server 203 sends an Access Transfer Notification to the access transfer control function (ATCF) 501, e.g. a SIP re-INVITE or INVITE message, which indicates to the ATCF 501 that it should prepare for the transfer of media to PS100b.

The method uses signalling towards the IMS system from the MSC 203 to start session transfer from CS100a to PS100b. However, the signalling towards IMS may occur in other suitable ways.

Step 504

This step corresponds to step 404 in FIG. 4.

In some embodiments, the ATCF 501 retrieves the ports/codecs received from the user equipment 101 in its IMS registration. The MSC 203 is able to correlate the IMS registration made by the user equipment 101 and the one made by the MSC 203 on behalf of the user equipment 101, for instance based on the C-MSISDN or on the IMEI derived instance-id used by both those registrations. The ATCF 501 allocates media ports on the ATGW, forwards the Transfer Preparation Request (TRP) to the P-CSCF 401 after comprising, in that message, the IP address/ports the user equipment 101 intends to use after the rSRVCC, as well as the IP address/ports the ATGW is sending voice media to, i.e. the SDP for both the user equipment 101 and the ATGW may be comprised in the message.

In some embodiments, the TRP comprises a parameter indicating that rSRVCC is done. The parameter enables the P-CSCF 401 to distinguish this case, i.e. rSRVCC, when the setup of the dedicated bearer shall be delayed, from an ordinary bearer resource request over Rx when the dedicated bearer is set up immediately.

This is a trigger to the next step, step 506a, for halting the bearer setup.

Step 506a

This step corresponds to step 406a in FIG. 4.

The P-CSCF 401 waits or halts to initiate the bearer setup towards P-GW 207 since this bearer establishment is due to rSRVCC.

Due to a race condition, i.e. the user equipment 101 may not yet have made the handover to LTE at this point in time, the bearer allocation for the voice bearer needs to be delayed and done only when the user equipment 101 has completed the handover to LTE.

The P-CSCF 401 needs to distinguish this case, i.e. rSRVCC, when the setup of the dedicated bearer shall be delayed, from an ordinary bearer resource request over Rx when the dedicated bearer is set up immediately. The P-CSCF 401 will understand that rSRVCC is done by the parameter included in the message from the ATCF in step 504. In some embodiments, it may be possible to know from configuration, even without an explicit indication over Rx, if delayed allocation shall be done. E.g. in the case of IMS voice only deployed over LTE but not in 2G/3G, the P-CSCF 401 may use the Radio Access Technology (RAT) information which indicates in which RAT the user equipment 101 is attached.

Step 512

This step corresponds to step 412 in FIG. 4.

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 sends an Access Transfer Preparation Request to the ATCF 501 and the media path between ATCF/ATGW and the MSC Server/MGW is to be established.

Step 511

This step corresponds to step 411 in FIG. 4.

The MSC 203 sends a "handover command" to the BSC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

The BSC 301 forwards the "handover command" to the user equipment 101, indicating CS to PS handover.

Step 513

This step corresponds to step 413 in FIG. 4.

A Tracking Area Update (TAU) or an Inter-Radio Access Technology (IRAT) PS handover is performed. TAU is a procedure initiated by the user equipment 101 to update the registration status with the network. There are many reasons for a TAU, e.g. the user equipment 101 moves into a new Tracking Area (TA), inter-system change, when a user equipment 101 comes back to LTE after CS fallback etc.

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 may send an Access Transfer Preparation Request to the ATCF 501 and the media path between ATCF/ATGW and the MSC Server/MGW is to be established.

The user equipment 101 may send a Handover confirmation to the eNB 103. In other words, handover to LTE is performed.

The eNB 103 may send a Handover Notify to the MME 201. In other words, handover to LTE is performed.

Step 515

This step corresponds to step 415 in FIG. 4.

The MME 201 sends a Modify Bearer Request to the SGW 207 to update PS bearer contexts first. The SGW 207 forwards the Modify Bearer Request to the PGW 207.

The MME 201 tells the PGW 207 and SGW 207 that the user equipment 101 is now reachable via the eNB 103. The new dedicated bearer for voice is added in step 506b as described below.

Step 516

This step corresponds to step 416 in FIG. 4.

The VoIP call or any communications service may be sent to the user equipment 101 in LTE via the default bearer.

Step 517

This step corresponds to step 417 in FIG. 4, except that it goes from the PGW 207 to the P-CSCF 401, instead of from the PGW 207 to the PCRF 201 as in FIG. 4.

The PDN GW 207 informs the P-CSCF 401 about the change of, for example, the RAT type.

Step 506b

This step corresponds to step 406b in FIG. 4

The P-CSCF 401 continues the halted voice bearer allocation. The P-CSCF 401 builds the corresponding PCC rule and sends it to the PGW 207.

The P-CSCF 401 will learn that the handover to LTE is completed through the, existing, RAT change signalling from the PGW 207, at which point the P-CSCF 401 may trigger the PGW 207 to start dedicated bearer allocation.

Step 505

After the bearer setup has continued in step 506b, the IMS, i.e. the P-CSCF 401, initiates bearer handling in EPC by sending the Resource Allocation request over the Rx interface, towards the PCRF 210 to trigger the setup of a Guaranteed Bit Rate (GBR) dedicated PS bearer with Quality of Service (QoS) suitable for voice.

Step 518

This step corresponds to step 418 in FIG. 4.

The MME 201 sets up the dedicated bearer for the user equipment 101.

Even though the arrow symbolizing step 518 goes between the MME 201 and the user equipment 101, it may include multiple steps between the PCRF 210, PGW 207, SGW 207, MME 201 and the UE 101.

Step 519

This step corresponds to step 419 in FIG. 4.

Up until the point that the dedicated GBR bearer is allocated, i.e. after step 506b, the voice call user data may be sent in the default bearer in LTE. The default bearer in the IMS APN may be a QCI=5 bearer optimized for signalling and not for voice media. However for a short time after the handover to LTE, this bearer may be used for voice media also. TFT filters shall then be set in such a way that in addition to signalling packets, also voice user flows are allowed. In case of an "allow all" default bearer, and using a Fire-wall on the IMS APN, also the MGW traffic must be allowed.

After step 506b the dedicated bearer has been allocated in LTE and the VoIP call will be moved to the dedicated bearer. Thus impact to user service quality experience, e.g. QoS, call drop, interruption time, is minimized.

The method for handling handover of the communications service according to some embodiments will now be described with reference to the combined signaling diagram and flowchart depicted in FIG. 6. In FIG. 56, the network node performing the halting of the bearer is the PGW 207.

Step 601

This step corresponds to step 401 in FIG. 4 and step 501 in FIG. 5.

The BSC/RNC 301 sends a handover required to the MSC Server 203, this message comprises the target Tracking Area Code. The handover required message comprises an indication this HO is for SRVCC. If the MSC Server 203 is the target MSC, it forwards the handover required to the anchor MSC Server.

Step 603

This step corresponds to step 403 in FIG. 4 and to step 503 in FIG. 5.

In some embodiments, the MSC Server 203 sends an Access Transfer Notification to the access transfer control function (ATCF) 501, e.g. a SIP re-INVITE or INVITE message, which indicates to the ATCF 501 that it should prepare for the transfer of media to PS100b.

The method uses signalling towards the IMS system from the MSC 203 to start session transfer from CS100a to PS100b. However, the signalling towards IMS may occur in other suitable ways.

Step 604

This step corresponds to step 404 in FIG. 4 and step 504 in FIG. 5.

In some embodiments, the ATCF 501 retrieves the ports/codecs received from the user equipment 101 in its IMS registration. The MSC 203 is able to correlate the IMS registration made by the user equipment 101 and the one made by the MSC 203 on behalf of the user equipment 101, for instance based on the C-MSISDN or on the IMEI derived instance-id used by both those registrations. The ATCF 501 allocates media ports on the ATGW, forwards the Transfer Preparation Request (TRP) to the P-CSCF 401 after comprising, in that message, the IP address/ports the user equipment 101 intends to use after the rSRVCC, as well as the IP address/ports the ATGW is sending voice media to, i.e. the SDP for both the user equipment 101 and the ATGW may be comprised in the message.

Step 605a

This step corresponds to step 405 in FIG. 4.

The IMS, i.e. the P-CSCF 401, initiates bearer handling in EPC by sending the Resource Allocation request over the Rx interface, towards the PCRF 210 to trigger the setup of a Guaranteed Bit Rate (GBR) dedicated PS bearer with Quality of Service (QoS) suitable for voice.

Step 605b

The PCRF 210 forwards the Resource allocation request to the PGW 207.

In some embodiments, the Resource allocation message comprises a parameter indicating that rSRVCC is done. The parameter enables the PGW 207 to distinguish this case, i.e. rSRVCC, when the setup of the dedicated bearer shall be delayed, from an ordinary bearer resource request over Rx when the dedicated bearer is set up immediately.

This is a trigger to the next step, step 606a, for halting the bearer setup.

Step 606a

This step corresponds to step 406a in FIG. 4 and step 506a in FIG. 5.

The PGW 207 waits or halts to initiate the bearer setup towards P-GW 207 since this bearer establishment is due to rSRVCC.

Due to a race condition, i.e. the user equipment 101 may not yet have made the handover to LTE at this point in time, the bearer allocation for the voice bearer needs to be delayed and done only when the user equipment 101 has completed the handover to LTE.

The PGW 207 needs to distinguish this case, i.e. rSRVCC, when the setup of the dedicated bearer shall be delayed, from an ordinary bearer resource request over Rx when the dedicated bearer is set up immediately. The PGW 207 will understand that rSRVCC is done by the parameter included in the message from the ATCF in step 605*b*. In some embodiments, it may be possible to know from configuration, even without an explicit indication over Rx, if delayed allocation shall be done. E.g. in the case of IMS voice only deployed over LTE but not in 2G/3G, the PGW 207 may use the Radio Access Technology (RAT) information which indicates in which RAT the user equipment 101 is attached.

Step 612

This step corresponds to step 412 in FIG. 4 and step 512 in FIG. 5.

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 sends an Access Transfer Preparation Request to the ATCF 501 and the media path between ATCF/ATGW and the MSC Server/MGW is to be established.

Step 611

This step corresponds to step 411 in FIG. 4 and step 511 in FIG. 5.

The MSC 203 sends a "handover command" to the BSC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

The BSC 301 forwards the "handover command" to the user equipment 101, indicating CS to PS handover.

Step 613

This step corresponds to step 413 in FIG. 4 and to step 513 in FIG. 5.

A Tracking Area Update (TAU) or an Inter-Radio Access Technology (IRAT) PS handover is performed. TAU is a procedure initiated by the user equipment 101 to update the registration status with the network. There are many reasons for a TAU, e.g. the user equipment 101 moves into a new Tracking Area (TA), inter-system change, when a user equipment 101 comes back to LTE after CS fallback etc.

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 may send an Access Transfer Preparation Request to the ATCF 501 and the media path between ATCF/ATGW and the MSC Server/MGW is to be established.

The user equipment 101 may send a Handover confirmation to the eNB 103. In other words, handover to LTE is performed.

The eNB 103 may send a Handover Notify to the MME 201. In other words, handover to LTE is performed.

Step 615

This step corresponds to step 415 in FIG. 4 and step 515 in FIG. 5.

The MME 201 sends a Modify Bearer Request to the SGW 207 to update PS bearer contexts first. The SGW 207 forwards the Modify Bearer Request to the PGW 207.

The MME 201 tells the PGW 207 and SGW 207 that the user equipment 101 is now reachable via the eNB 103. The new dedicated bearer for voice is added in step 506*b* as described below.

Step 616

This step corresponds to step 416 in FIG. 4 and step 516 in FIG. 5.

The VoIP call or any communications service may be sent to the user equipment 101 in LTE via the default bearer.

Step 517

This step corresponds to step 417 in FIG. 4 and step 517 in FIG. 5.

The PGW 207 informs the PCRF 210 about the change of, for example, the RAT type.

Step 606*b*

This step corresponds to step 406*b* in FIG. 4 and step 506*b* in FIG. 5.

The PGW 207 continues the halted voice bearer allocation. The PGW 207 builds the corresponding PCC rule.

The PGW 207 will learn that the handover to LTE is completed through the, existing, RAT change signalling from the PGW 207, at which point the PGW 207 may start the dedicated bearer allocation.

Step 618

This step corresponds to step 418 in FIG. 4 and step 518 in FIG. 5.

The MME 201 sets up the dedicated bearer for the user equipment 101.

Even though the arrow symbolizing step 618 goes between the MME 201 and the user equipment 101, it may include multiple steps between the PCRF 210, PGW 207, SGW 207, MME 201 and the UE 101.

Step 619

This step corresponds to step 419 in FIG. 4 and step 519 in FIG. 5.

Up until the point that the dedicated GBR bearer is allocated, i.e. after step 606*b*, the voice call user data may be sent in the default bearer in LTE. The default bearer in the IMS APN may be a QCI=5 bearer optimized for signalling and not for voice media. However for a short time after the handover to LTE, this bearer may be used for voice media also. TFT filters shall then be set in such a way that in addition to signalling packets, also voice user flows are allowed. In case of an "allow all" default bearer, and using a Fire-wall on the IMS APN, also the MGW traffic must be allowed.

After step 606*b* the dedicated bearer has been allocated in LTE and the VoIP call will be moved to the dedicated bearer. Thus impact to user service quality experience, e.g. QoS, call drop, interruption time, is minimized.

The method described above will now be described seen from the perspective of the network node, for enabling handover of a communication service between a circuit switched, referred to as CS, network 100*a* and a packet switched, referred to as PS, network 100*b* has a communications service in the CS network 100*a*. A user equipment 101 is located in the CS network 100*a* and has the communications service in the CS network 100*a*.

The method comprises the following steps to be performed by the MME 201: The following description uses an IMS voice call as example. However, any other type of communications service or multimedia service, such as e.g. video call, is also applicable.

The method comprises the following steps, which steps may as well be carried out in another suitable order than described below.

Step 701

Figure 6:
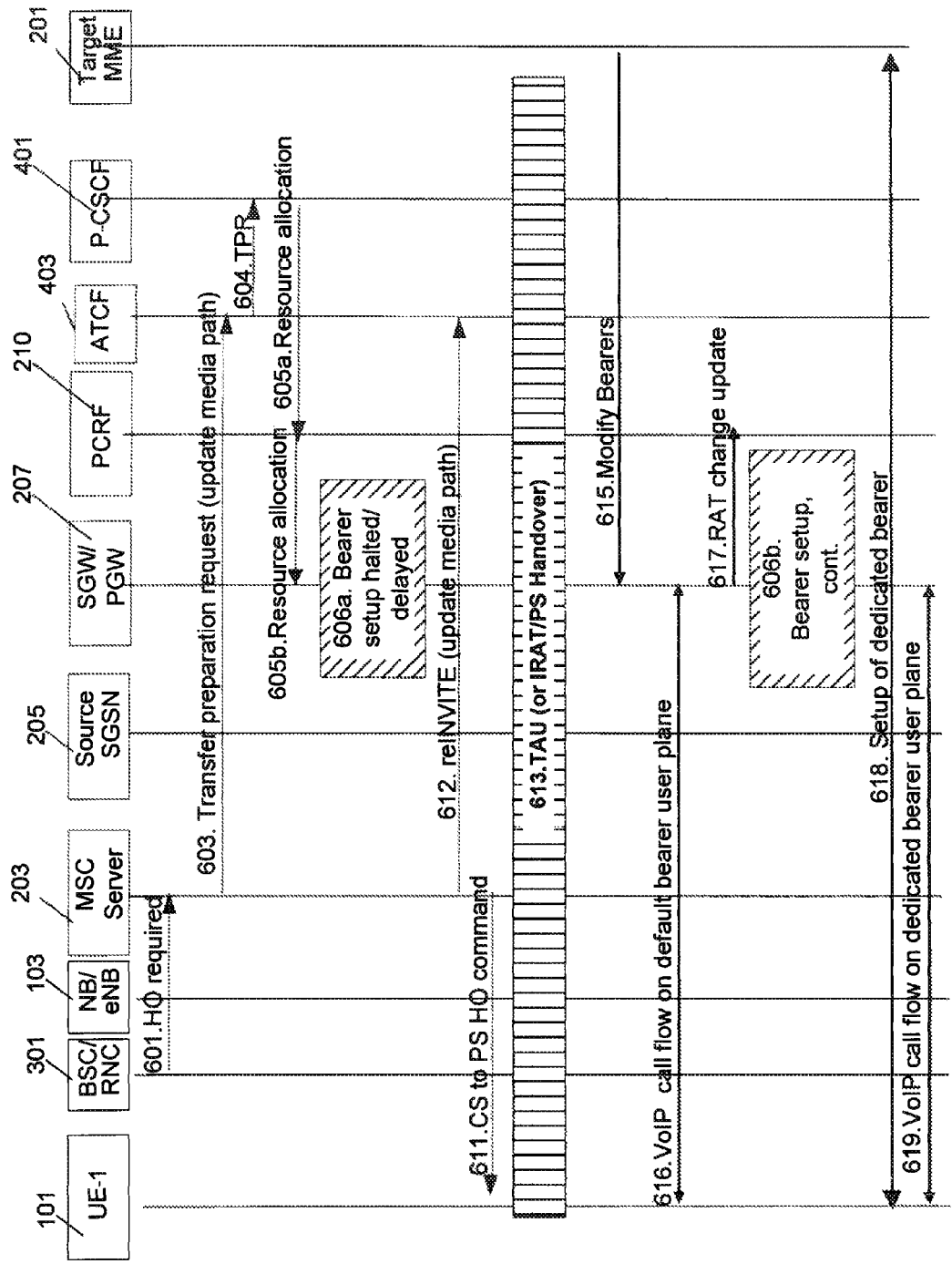
FIG. 6 is a combined flow chart and signalling diagram illustrating embodiments of a method.

This step corresponds to step 405 in FIG. 4, step 504 in FIG. 5 and step 605b in FIG. 6.

The network node receives a trigger indicating setup of a bearer associated with the communications network in the PS network 100b.

In some embodiments, the trigger is based on a return Single Radio Voice Call Continuity, referred to as rSRVCC.

In some embodiments, the bearer is a dedicated bearer associated with the communications service.

In some embodiments, the bearer is a guaranteed bit rate, referred to as GBR, bearer.

In some embodiments, the communications service is a voice service or a video service.

Step 701a

This is substep of step 701. The step corresponds to step 405 in FIG. 4.

In some embodiments, the network node is a policy and charging rules function, referred to as PCRF 210 node.

In some embodiments, the network node receives a first request message from a Proxy Call Session Control Function, referred to as P-CSCF, node 401. The first request message comprises a request for setup of a bearer associated with the communications service in the PS network 100b.

Step 701b

This is substep of step 701, and a step performed instead of step 701a. The step corresponds to step 505 in FIG. 5.

In some embodiments, the network node is a proxy call session control function, referred to as P-CSCF 401, node.

In some embodiments, the network node receives a second request message from an access transfer control function, referred to as ATCF 403, node. The second request message is a transfer preparation request comprising an address related to the communications service.

Step 701b

This is substep of step 701, and a step performed instead of step 701a and instead of step 701b. The step corresponds to step 605b in FIG. 6.

In some embodiments, the network node is a packet data network, referred to as PGW 207.

In some embodiments, the network node receives, from a policy and charging rules function, referred to as PCRF 210, node, a first request message comprises a request for setup of a bearer associated with the communications service in the PS network 100b.

Step 702

This step corresponds to step 406a in FIG. 4, step 506a in FIG. 5 and step 606a in FIG. 6.

The network node, based on the trigger, determines that the setup of the bearer in the PS network 100b should be halted.

Step 702a

This is a substep of step 702. This step corresponds to step 406a in FIG. 4, step 506a in FIG. 5 and step 606b in FIG. 6.

In some embodiments, the network node determines that the trigger is comprised in a return Single Radio Voice Call Continuity, referred to as rSRVCC, message.

Step 702b

This is a substep of step 702. This step corresponds to step 406a in FIG. 4, step 506a in FIG. 5 and step 606b in FIG. 6.

In some embodiments, the network node determines that a parameter indicating that the setup of the bearer associated with the communications service in the PS network 100b should be halted is comprised in the trigger.

Step 703

This step corresponds to step 406a in FIG. 4, step 506a in FIG. 5 and step 606a in FIG. 6.

The network node halts the bearer setup.

Step 704

This step corresponds to step 605 in FIG. 6.

In some embodiments, the network node receives a third request message from a mobility management entity, referred to as MME 201. The third request message comprises a request to modify the bearer in the PS network.

Step 705

This step corresponds to step 617 in FIG. 6.

In some embodiments, the network node sends information that the handover from the CS network 100a to the PS network 100b is completed to the PCRF 210.

Step 706

This step corresponds to step 619 in FIG. 6.

In some embodiments, the network node sends the communications service using the bearer.

Step 707

This step corresponds to step 417 in FIG. 4, step 517 in FIG. 5 and step 615 in FIG. 6.

The network node receives information that the handover from the CS network 100a to the PS network 100b is completed.

In some embodiments, the information that the handover from the CS network (100a) to the PS network 100b is completed is received 417 from a packet data network gateway, referred to as PGW 207.

Step 708

This step corresponds to step 406b in FIG. 4, step 506b in FIG. 5 and step 606b in FIG. 6.

The network node sets up the bearer associated with the communications service when the information that the handover from the CS network 100a to the PS network 100b is completed is received.

Step 709

This step corresponds to step 505 in FIG. 5.

In some embodiments, when the network node is a P-CSCF 401, the network node sends a first request message to a policy and charging rules function, referred to as PCRF 210. The node, which first request message comprises a request for setup of a bearer associated with the communications service in the PS network 100b.

Figure 7:
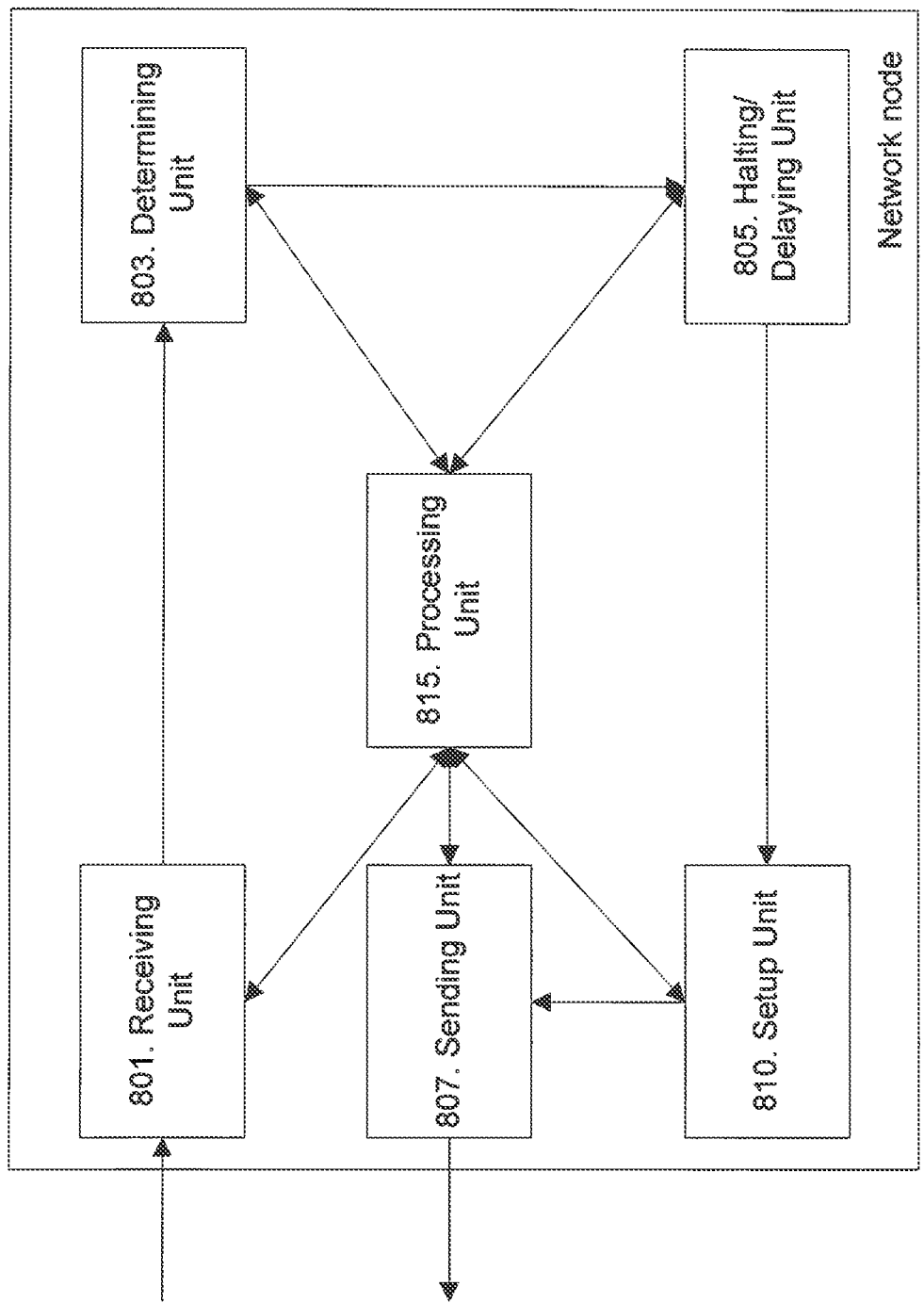
FIG. 7 is a schematic block diagram illustrating embodiments of a network node.

To perform the method steps shown in FIGS. 4, 5 and 6 for enabling handover of a communications service from a circuit switched, referred to as CS, network 100a to a packet switched, referred to as PS, network 100b the network node comprises an arrangement as shown in FIG. 7. A user equipment 101 is located in the CS network 100a and has the communications service in the CS network 100a.

The network node comprises a receiving unit 801 configured to receive a trigger indicating setup of a bearer associated with the communications network in the PS network 100b. The receiving unit 801 is further configured to receive, information that the handover from the CS network 100a to the PS network 100b is completed. In some embodiments, the network node is a policy and charging rules function, referred to as PCRF 210, node. In some embodiments, the receiving unit 801 is further configured to receive a first request message from a Proxy Call Session Control Function, referred to as P-CSCF, node 401. The first request message comprises a request for setup of a bearer associated with the communications service in the PS network 100b. In some embodiments, the information that the handover from the CS network 100a to the PS network 100b is completed is received from a packet data network gateway, referred to as PGW 207.

In some embodiments, the network node is a proxy call session control function, referred to as P-CSCF 401, node. In some embodiments, the receiving unit 801 is further configured to receive a second request message from an access transfer control function, referred to as ATCF 403, node. The second request message is a transfer preparation request comprising an address related to the communications service.

In some embodiments, the network node is a packet data network, referred to as PGW 207. In some embodiments the receiving unit 801 is further configured to receive, from a policy and charging rules function, referred to as PCRF 210, node, a first request message comprises a request for setup of a bearer associated with the communications service in the PS network 100b. In some embodiments, the network node receive a third request message from a mobility management entity, referred to as MME 201, which third request message comprises a request to modify the bearer in the PS network.

In some embodiments, the trigger is based on a return Single Radio Voice Call Continuity, referred to as rSRVCC In some embodiments, the bearer is a dedicated bearer associated with the communications service. In some embodiments, the bearer is a guaranteed bit rate, referred to as GBR, bearer.

In some embodiments, the communications service is a voice service or a video service, or any other media service.

The network node comprises a determining unit 803 configured to, based on the trigger, determine that the setup of the bearer in the PS network 100b should be halted. In some embodiments, the determining unit 803 is further configured to determine that the trigger is comprised in a return Single Radio Voice Call Continuity, referred to as rSRVCC, message. In some embodiments, the determining unit 803 is further configured to determine that a parameter indicating that the setup of the bearer associated with the communications service in the PS network 100b should be halted is comprised in the trigger.

The network node comprises a halting unit 805 configured to halt the bearer setup.

The network node comprises a setup unit 810 configured to set up the bearer associated with the communications service when the information that the handover from the CS network 100a to the PS network 100b is completed is received.

In some embodiments, the network node further comprises a sending unit 807 configured to send a first request message to a policy and charging rules function, referred to as PCRF 210, node. In some embodiments, the first request message comprises a request for setup of a bearer associated with the communications service in the PS network 100b. In some embodiments, the sending unit 807 is further configured to send information that the handover from the CS network 100a to the PS network 100b is completed to the PCRF 210. In some embodiments, the sending unit 807 is configured to send the communications service using the bearer.

The present mechanism for enabling handover of a communications service from a circuit switched, referred to as CS, network 100a to a packet switched, referred to as PS, network 100b may be implemented through one or more processors, such as a processor unit 815 in the network node arrangement depicted in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the network node. One such carrier may be in the form of a CD ROM disc. It is however feasible with other data carriers such as a memory stick. The computer program code can furthermore be provided as pure program code on a server and downloaded to the network node remotely.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a network node for enabling handover of a communications service from a circuit switched (CS) network to a packet switched (PS) network, wherein a user equipment is located in the CS network and having the communications service in the CS network, the method comprising:
   receiving a trigger indicating setup of a dedicated bearer associated with the communications network in the PS network;
   based on the trigger, determining that the setup of the dedicated bearer in the PS network should be delayed;
   delaying the dedicated bearer setup;
   sending media on a default bearer while the setup of the dedicated bearer is delayed;
   receiving, information that the handover from the CS network to the PS network is completed; and
   setting up the dedicated bearer associated with the communications service when the information that the handover from the CS network to the PS network is completed is received.

2. The method according to claim 1, wherein
   the network node is a policy and charging rules function (PCRF) node, and
   the receiving the trigger indicating the setup of the dedicated bearer in the PS network comprises: receiving a first request message from a Proxy Call Session Control Function (P-CSCF) node, the first request message comprises a request for the setup of the dedicated bearer associated with the communications service in the PS network; and
   wherein the information that the handover from the CS network to the PS network is completed is received from a packet data network gateway (PGW).

3. The method according to claim 1, wherein the network node is a proxy call session control function (P-CSCF) node, and wherein the receiving the trigger indicating the setup of the dedicated bearer in the PS network comprises:
   receiving a second request message from an access transfer control function (ATCF) node, the second request message is a transfer preparation request comprising an address related to the communications service; and wherein the method further comprises:

sending a first request message to a policy and charging rules function (PCRF) node, the first request message comprises a request for the setup of the dedicated bearer associated with the communications service in the PS network.

4. The method according to claim 1, wherein the network node is a packet data network gateway (PGW) wherein the receiving the trigger indicating the setup of the dedicated bearer in the PS network comprises:

receiving, from a policy and charging rules function (PCRF) node, a first request message comprises a request for the setup of the dedicated bearer associated with the communications service in the PS network; and wherein the method further comprises:

receiving a third request message from a mobility management entity (MME), the third request message comprises a request to modify the dedicated bearer in the PS network;

sending information that the handover from the CS network to the PS network is completed to the PCRF; and sending the communications service using the dedicated bearer.

5. The method according to claim 1, wherein the trigger is based on a handover from the CS network to the PS network using Single Radio Voice Call Continuity.

6. The method according to claim 1, wherein the determining that the setup of the dedicated bearer associated with the communications service in the PS network should be delayed further comprises:

determining that the trigger is comprised in a return Single Radio Voice Call Continuity (rSRVCC) message.

7. The method according to claim 1, wherein the determining that the setup of the dedicated bearer in the PS network should be delayed further comprises:

determining that a parameter indicating that the setup of the dedicated bearer associated with the communications service in the PS network should be delayed is comprised in the trigger.

8. The method according to claim 1, wherein the dedicated bearer is provided with a guaranteed bit rate (GBR).

9. The method according to claim 1, wherein the communications service is an Internet Protocol Multimedia Subsystem (IMS) service.

10. A network node for enabling handover of a communications service from a circuit switched (CS) network to a packet switched (PS) network, wherein a user equipment is located in the CS network and having the communications service in the CS network, the network node comprising:

a receiving unit configured to receive a trigger indicating setup of a dedicated bearer associated with the communications network in the PS network;

a determining unit configured to, based on the trigger, determine that the setup of the dedicated bearer in the PS network should be delayed;

a delaying unit configured to delay the dedicated bearer setup;

a processing unit configured to arrange for media flow to be transferred on a default bearer while the setup of the dedicated bearer is delayed;

wherein the receiving unit is further configured to receive, information that the handover from the CS network to the PS network is completed, and wherein the network node further comprises:

a setup unit configured to set up the dedicated bearer associated with the communications service when the information that the handover from the CS network to the PS network is completed is received.

11. The network node according to claim 10, wherein the network node is a policy and charging rules function (PCRF) node, and wherein receiving unit is further configured to receive a first request message from a Proxy Call Session Control Function (P-CSCF) node, the first request message comprises a request for the setup of the dedicated bearer associated with the communications service in the PS network; and wherein the information that the handover from the CS network to the PS network is completed is received from a packet data network gateway (PGW).

12. The method according to any of the claim 10, wherein the network node is a proxy call session control function (P-CSCF) node, and wherein the receiving unit is further configured to receive a second request message from an access transfer control function (ATCF) node which second request message is a transfer preparation request comprising an address related to the communications service; and wherein the network node further comprises:

a sending unit configured to send a first request message to a policy and charging rules function (PCRF) node, the first request message comprises a request for the setup of the dedicated bearer associated with the communications service in the PS network.

13. The network node according to claim 10, wherein the network node is a packet data network gateway (PGW), wherein the receiving unit is further configured to:

receive, from a policy and charging rules function (PCRF) node, a first request message comprises a request for the setup of the dedicated bearer associated with the communications service in the PS network; and to receive a third request message from a mobility management entity (MME), the third request message comprises a request to modify the dedicated bearer in the PS network;

and wherein the sending unit is further configured to:

send information that the handover from the CS network to the PS network is completed to the PCRF; and to send the communications service using the dedicated bearer.

14. The network node according to claim 10, wherein the trigger is based on a handover from the CS network to the PS network using Single Radio Voice Call Continuity.

15. The network node according to claim 10, wherein the determining unit is further configured to determine that the trigger is comprised in a return Single Radio Voice Call Continuity (rSRVCC) message.

16. The network node according to claim 10, wherein the determining unit is further configured to determine that a parameter indicating that the setup of the dedicated bearer associated with the communications service in the PS network should be delayed is comprised in the trigger.

17. The network node according to claim 10, wherein the dedicated bearer is provided with a guaranteed bit rate (GBR).

18. The network node according to claim 10, wherein the communications service is an Internet Protocol Multimedia Subsystem (IMS) service.

* * * * *